W. H. COPPING.
TIRE RIM TOOL.
APPLICATION FILED JULY 16, 1917.
1,259,212.
Patented Mar. 12, 1918.
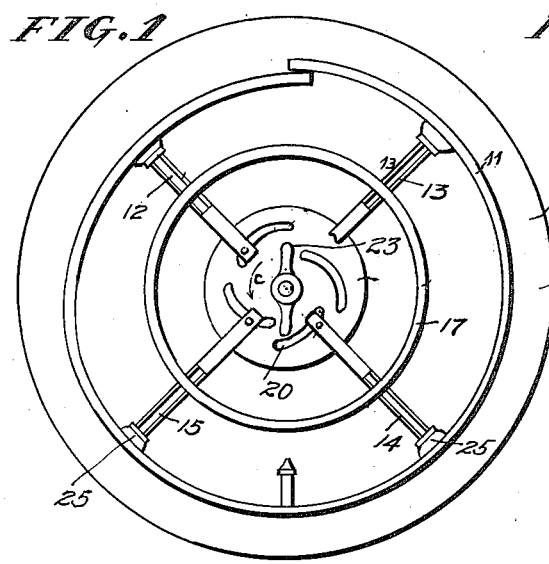
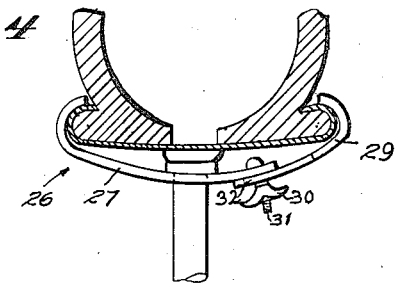
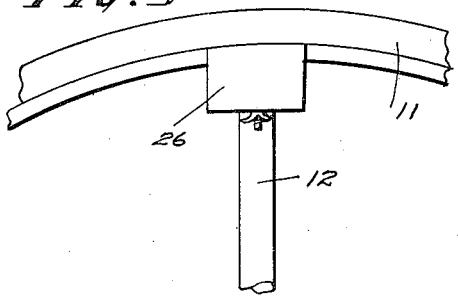
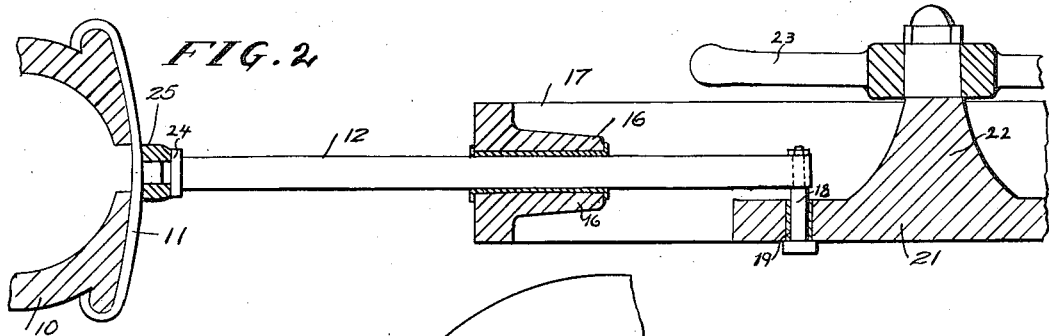
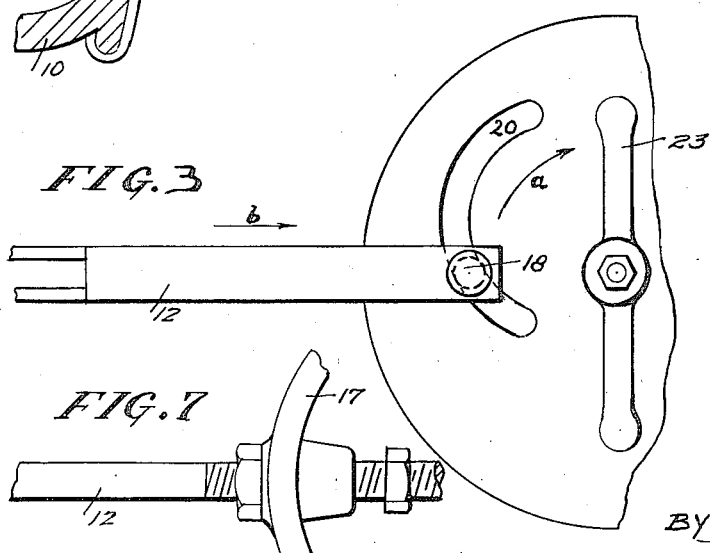
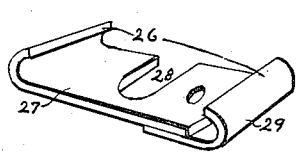
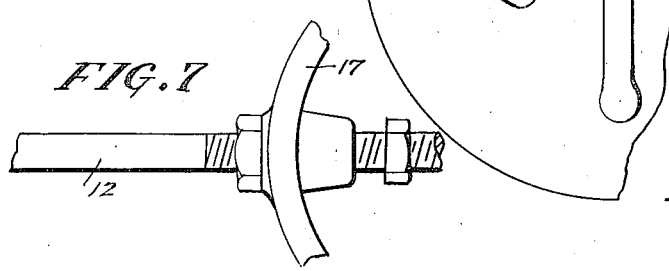
INVENTOR,
WALLACE H. COPPING
BY Hazard & Miller
ATT'YS

UNITED STATES PATENT OFFICE.

WALLACE H. COPPING, OF PASADENA, CALIFORNIA.

TIRE-RIM TOOL.

1,259,212.  Specification of Letters Patent.  Patented Mar. 12, 1918.

Application filed July 16, 1917. Serial No. 180,772.

*To all whom it may concern:*

Be it known that I, WALLACE H. COPPING, a citizen of the United States, residing at Pasadena, in the county of Los Angeles and State of California, have invented new and useful Improvements in Tire-Rim Tools, of which the following is a specification.

This invention relates to a tire rim tool.

The principal object of this invention is to provide a tool for use with laterally split tire rims to contract and expand them so that the tire casing may be readily removed, and thereafter re-placed upon the rim without danger of distorting the rim.

Other objects will appear hereinafter.

The invention is illustrated, by way of example, in the accompanying drawings in which:

Figure 1 is a view in side elevation illustrating the tool as applied to expand the tire rim.

Fig. 2 is a view in section and elevation, as seen on the line 2—2 of Fig. 1, and particularly illustrates the detail construction of one of the pressure arms.

Fig. 3 is an enlarged fragmentary view illustrating one of the pressure arms and its connection with the operating cam.

Fig. 4 is a fragmentary view in section illustrating one of the pressure arms as adapted to engage the rim of the tire and break the joint therein.

Fig. 5 is a fragmentary view in side elevation illustrating the parts shown in Fig. 4.

Fig. 6 is a fragmentary view in perspective illustrating one of the detachable clamping jaws.

Fig. 7 is a fragmentary view of a modified form of pressure arm and adjustment therefor.

Referring more particularly to the drawings, 10 indicates a pneumatic tire casing which is normally mounted upon a demountable flange tire rim 11. This rim is laterally split, its edges being secured by a suitable interlocking joint which normally holds the adjacent ends of the rim against each other to form a continuous concentric circular support for the tire. It will be understood that the rim may be of any particular construction and that the present invention is concerned with breaking the joint in the rim and thereafter restoring the rim to its normal position.

The tool used for accomplishing this purpose consists of a set of radial pressure arms 12, 13, 14 and 15. These arms are positioned at right angles to each other and extend through bearings 16 formed around a bearing ring 17. The inner ends of the arms are provided with pins 18 upon which cam rollers 19 are rotatably disposed. These rollers extend through eccentric cam slots 20 formed in a face cam disk 21. A squared stud 22 extends outwardly from this disk and is provided to receive a clamping handle 23 by which the disk may be rotated.

The outer ends of the pressure arms are fitted with collars 24 adapted to receive pads 25 which bear against the inner face of the ring when the ring is being expanded. A removable clamping jaw 26 may be positioned beneath the collar 24 to contract the rim when the tire is to be removed. This member consists of a flange element 27 formed with a slot 28 which passes around the shank of the arms and to which is adjustably secured a movable flange 29. These flanges are clamped together by a wing nut 30 and a clamping screw 31, the latter passing through an elongated opening 32 in the element 29, thus permitting the jaws to engage the opposite sides of the rim and cause it to be drawn inwardly under the influence of the cam. The form of the device shown in Fig. 7 provides adjustment for the pressure arms without the use of the cam disk 21. In this case the pressure bars are threaded to receive locking nuts 33 and 34 positioned upon opposite sides of the bearing ring 17. By this construction when the nut 33 is tightened against the outer face of the bearing ring the pressure bars will be forced outwardly and when the nut 34 is forced against the inner face of the bearing ring the bars will be drawn inwardly.

In operation, the joint in the tire may be broken by placing clamping jaws 26 upon opposite pressure arms, such as the arms 12 and 14, or the arms 13 and 15. As the hand lever 23 is turned in the direction of the arrow —*a*—, as indicated in Fig. 3, the pressure rods will be drawn inwardly in the direction of the arrow —*b*—, as indicated in the same figure. This is due to the eccentric action of the rollers 19 within the slots 20. During this movement the jaws 26 will engage the outer faces of the rim flanges and will cause one of the ends of the rim at the joint to be pulled in so that it will slip beneath the opposite end of the rim. After this action has taken place, the clamping jaws may be removed and the pressure pads 25 placed upon the ends of the arms. The device may then be positioned as shown in Fig. 1 and the cam rotated in the direction of the arrow —c—. This will cause the roller to move outwardly along the cam grooves 20 and thereby force the pressure arms to simultaneously exert pressure at four points around the inner periphery of the rim. The rim will thus be expanded and the over-lapping ends of the joint brought to an abutting position. The arms may then be retracted and the tool removed.

It will thus be seen that the tool here provided is simple in its construction and will act quickly and effectively to contract and expand a laterally split tire rim.

While I have shown the preferred construction of my tire rim tool as now known to me, it will be understood that various changes in the combination, construction and arrangement of parts may be made by those skilled in the art without departing from the spirit of my invention.

I claim:

In a tire rim tool, radially movable arms, collars fixed upon the outer ends of the arms, pads socketed on the ends of the arms against the collars, hooked flange members slotted to removably fit the arms and against the collars, and second hooked flange members adjustably connected to the first hooked flange members; said hooked flange members being adapted to grip a tire rim.

In testimony whereof I have signed my name to this specification.

WALLACE H. COPPING.